(12) United States Patent
Huang et al.

(10) Patent No.: US 9,401,619 B2
(45) Date of Patent: Jul. 26, 2016

(54) CHARGING DEVICE

(71) Applicant: HON HAI PRECISION INDUSTRY CO., LTD., New Taipei (TW)

(72) Inventors: Jung-Yu Huang, New Taipei (TW); Kuo-Wei Su, New Taipei (TW); Jin-Yuan Teng, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 284 days.

(21) Appl. No.: 14/151,726

(22) Filed: Jan. 9, 2014

(65) Prior Publication Data

US 2014/0191708 A1 Jul. 10, 2014

(30) Foreign Application Priority Data

Jan. 10, 2013 (TW) .............................. 102200525 U

(51) Int. Cl.
*H02J 7/00* (2006.01)
*H02J 7/02* (2016.01)
*H02J 9/00* (2006.01)

(52) U.S. Cl.
CPC ................. *H02J 7/02* (2013.01); *H02J 7/0042* (2013.01); *H02J 7/0031* (2013.01); *H02J 9/005* (2013.01)

(58) Field of Classification Search
USPC .......................................... 320/107, 112, 114
See application file for complete search history.

(56) References Cited

U.S. PATENT DOCUMENTS

2009/0295232 A1* 12/2009 McGinley et al. ............ 307/126
2013/0093381 A1* 4/2013 McGinley et al. ............ 320/107

\* cited by examiner

*Primary Examiner* — Samuel Berhanu
(74) *Attorney, Agent, or Firm* — ScienBiziP, P.C.

(57) ABSTRACT

A charging device includes a power converting unit and a power output unit. The power converting unit comprises a first conductive pin, a second conductive pin, and a converter. The first conductive pin and the second conductive pin are electrically connected to an alternating current (AC) power. The converter converts the AC power to a direct current (DC) power and outputs the DC power. The power output unit is electrically connected to the converter via a number of cables, and outputs the DC power to an electronic device. The power output unit comprises a first switch and a second switch. When the electronic device separates from the power output unit, the first switch controls the converter to stop receiving the AC power. When the electronic device is completely charged, the second switch controls the converter to stop receiving the AC power.

18 Claims, 8 Drawing Sheets

CHARGING DEVICE

BACKGROUND

1. Technical Field

The present disclosure relates to a charging device.

2. Description of Related Art

Portable electronic devices, such as mobile phones, often have rechargeable batteries for providing operation voltages to the electrical components. Usually, a portable electronic device is connected to a charging device via a power line and a connector to charge the battery. However, when the electronic device is removed from the charging device, if the charging device is still electrically connected to an alternating current (AC) power source, the charging device may keep consuming power, which is wasteful.

Therefore, what is needed is a means to overcome the above-described shortcoming.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one." The references "a plurality of" and "a number of" mean "at least two."

Reference will be made to the drawings to describe various embodiments.

Figure 1:
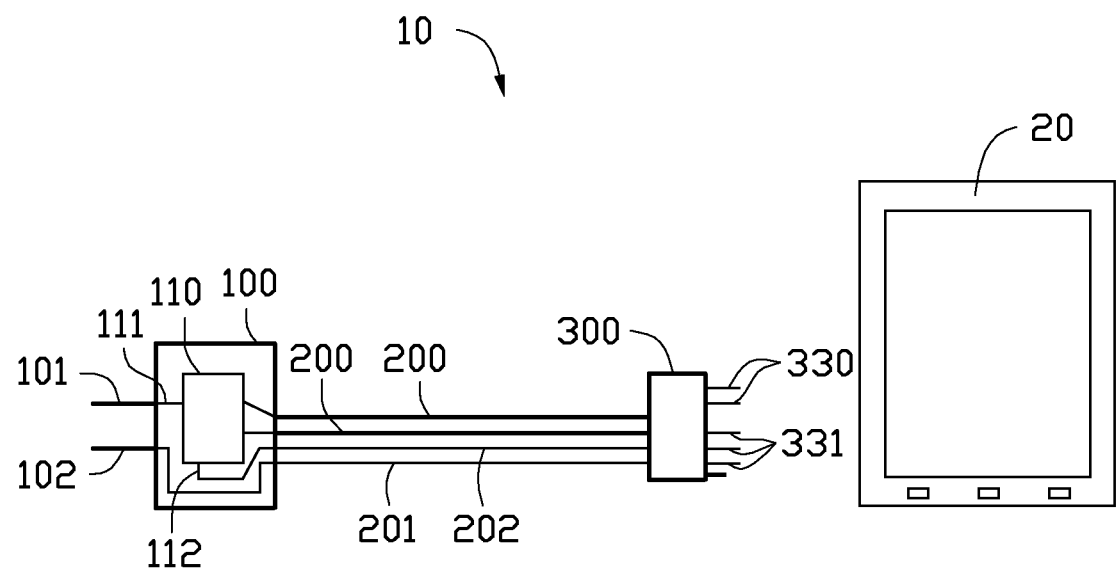
FIG. 1 is a schematic view of a first embodiment of a charging device having a power output unit.

FIG. 1 shows an embodiment of a charging device 10. The charging device 10 includes a power converting unit 100, a power output unit 300, and a plurality of cables 200 connected between the power converting unit 100 and the power output unit 300. The power converting unit 100 converts an alternating current (AC) power from an external power source to a direct current (DC) power, and outputs the DC power to the power output unit 300 via the plurality of cables 200. The power output unit 300 is configured to electrically connect to an electronic device 20. The power output unit 300 outputs the DC power to the electronic device 20 to charge the electronic device 20. The electronic device 20 can be, but is not limited to, a smart phone, a mobile Internet device (MID), or other similar device.

The power converting unit 100 includes a first conductive pin 101, a second conductive pin 102, and a converter 110. The first conductive pin 101 and the second conductive pin 102 are electrically connected to the AC power. The first conductive pin 101 is electrically connected to the converter 110. The second conductive pin 102 is electrically connected to the power output unit 300 via a first cable 201. The converter 110 includes a first input terminal 111 and a second input terminal 112. The first input terminal 111 is electrically connected to the first conductive pin 101. The second input terminal 112 is electrically connected to the power output unit 300 via a second cable 202. The second input terminal 112 is selectively electrically connected to or disconnected from the second conductive pin 102 under control of the power output unit 300. The converter 110 is electrically connected to the power output unit 300 via the plurality of cables 200.

Figure 2:
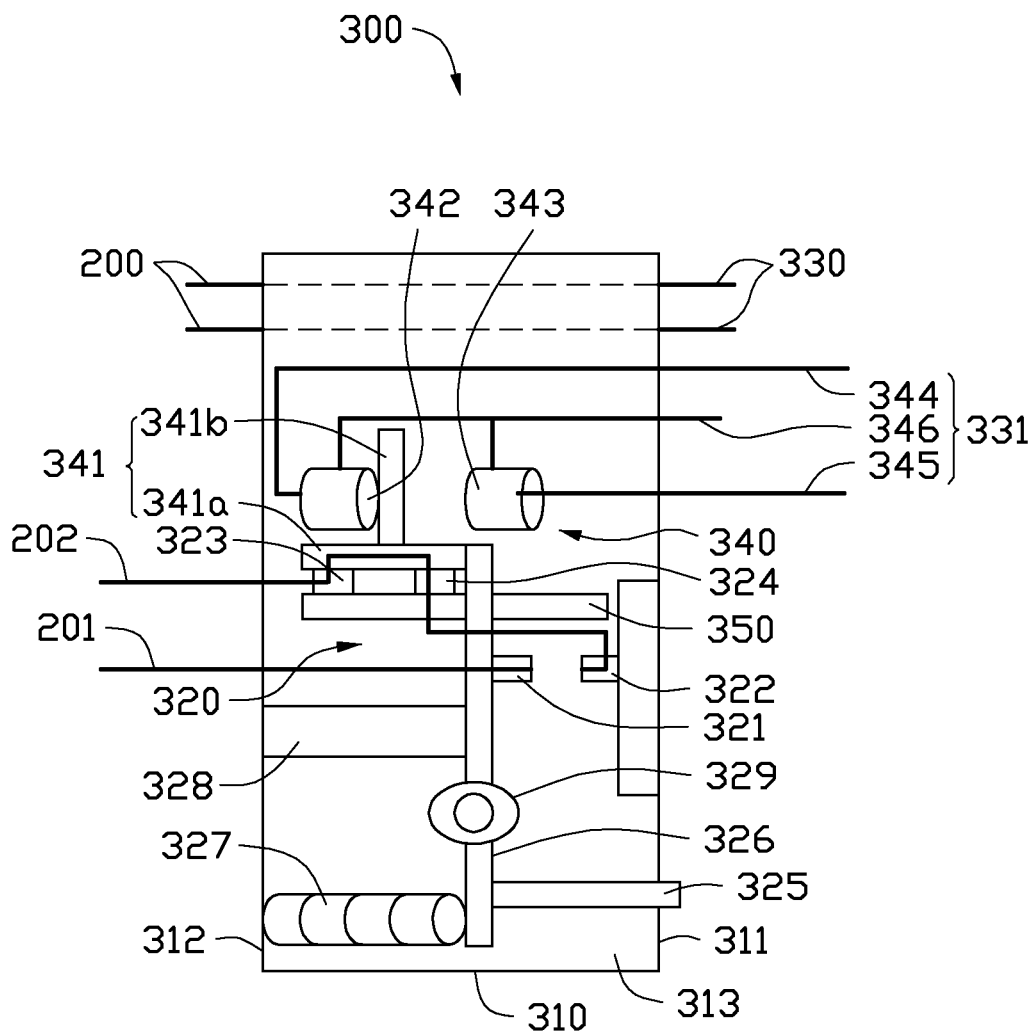
FIG. 2 is a schematic diagram of an internal structure of the power output unit of the charging device of FIG. 1.

FIG. 2 shows a schematic diagram of an internal structure of the power output unit 300. The power output unit 300 includes a shell 310, a plurality of electrical pins 330, and a detection control portion 331. The shell 310 defines a receiving space to receive the plurality of electrical pins 330 and the detection control portion 331. The shell 310 includes a first side surface 311, a second surface 312 opposite from the first side surface 311, and a third side surface 313 located between the first side surface 311 and the second surface 312. The plurality of electrical pins 330 and the detection control portion 331 protrude out of the first side surface 311 to connect to the electronic device 20. The plurality of electrical pins 330 are electrically connected to the converter 110 via the plurality of cables 200. The detection control portion 331 detects whether the power output unit 300 is electrically connected to or disconnected from the electronic device 20 and whether the electronic device 20 is fully charged.

The power output unit 300 further includes a first switch 320 and a second switch 340 received in the receiving space of the shell 310. When the power output unit 300 is electrically connected to the electronic device 20, the first switch 320 is turned on. When the power output unit 300 is disconnected from the electronic device 20, the first switch 320 is turned off. When the electronic device 20 is fully charged, the second switch 340 controls the first cable 201 to disconnect from the second cable 202. When the electronic device 20 is being charged, the second switch 340 controls the first cable 201 to connect to the second cable 202.

The first switch 320 includes a first connection terminal 321, a second connection terminal 322, a third connection terminal 323, a fourth connection terminal 324, a detection bar 325, a rotation bar 326, an elastic member 327, a supporting portion 328, a pivot 329, and a platform 350. The platform 350 is located at a substantially middle portion of the third side surface 313.

The first connection terminal 321 is fixed on one end portion of the rotation bar 326 and electrically connected to the second conductive pin 102 via the first cable 201. The second connection terminal 322 is aligned with the first connection terminal 321 and fixed on the first side surface 311. The third connection terminal 323 is fixed on the platform 350 and adjacent to the second side surface 312. The third connection terminal 323 is electrically connected to the second input terminal 112 via the second cable 202. The fourth connection terminal 324 is fixed on the platform 350 and located adjacent to the third connection terminal 323. In one embodiment, the third connection terminal 323 and the fourth connection terminal 324 are located on a same surface of the platform 350, and the fourth connection terminal 324 is electrically connected to the second connection terminal 322 via the second cable 202.

The rotation bar 326 rotates about the pivot 329. A first end of the rotation bar 326 is connected to the second side surface 312 via the elastic member 327, and a second end of the rotation bar 326 extends toward the fourth connection terminal 324.

A first end of the detection bar 325 protrudes out of the first side surface 311, and a second end of the detection bar 325 resists against the first end of the rotation bar 326. The detection bar 325 and the elastic member 327 are located on two opposite sides of the rotation bar 326, respectively, and are substantially perpendicular to the rotation bar 326. When the electronic device 20 is electrically connected to the power output unit 300, the detection bar 325 is pushed into the shell 310 by the electronic device 20, thereby rotating the rotation bar 326 and compressing the elastic member 327. When the electronic device 20 is disconnected from the power output unit 300, the elastic member 327 rebounds to push the first end of the detection bar 325 out of the shell 310.

The supporting portion 328 is located on the second side surface 312 to limit a rotation angle of the rotation bar 326.

The second switch 340 includes a substantially T-shaped portion 341, a first electromagnetic portion 342, and a second electromagnetic portion 343. The first electromagnetic portion 342 and the second electromagnetic portion 343 are arranged in the shell 310. When a current flows through the first electromagnetic portion 342 and the second electromagnetic portion 343, the first electromagnetic portion 342 and the second electromagnetic portion 343 are magnetized and attract the T-shaped portion 341.

The T-shaped portion 341 includes a sliding member 341a and an attracting member 341b. The sliding member 341a is slidably connected to the platform 350. The attracting member 341b is located between the first electromagnetic portion 342 and the second electromagnetic portion 343. The attracting member 341b is capable of sliding along with the sliding member 341a. The sliding member 341a is located on and electrically connected between the third connection terminal 323 and the fourth connection terminal 324.

In the embodiment, the sliding portion 341a is a conductive element. When the attracting member 341b is attracted by the first electromagnetic portion 342, the sliding portion 341a contacts both the third connection terminal 323 and the fourth connection terminal 324, thereby electrically connecting the third connection terminal 323 to the fourth connection terminal 324. When the attracting member 341b is attracted by the second electromagnetic portion 343, the sliding portion 341b slides past the third connection terminal 323, thereby cutting off the electrical connection between the third connection terminal 323 and the fourth connection terminal 324.

In another embodiment, the sliding member 341a is directly fixed on the fourth connection terminal 324, and the fourth connection terminal 324 is slidable along the platform 350. The sliding member 341a is electrically connected to the third connection terminal 323 or disconnected from the third connection terminal 323 when the fourth connection terminal 324 slides along the platform 350.

The detection control portion 331 includes a first control terminal 344, a second control terminal 345, and a third control terminal 346. The first control terminal 344 and the second control terminal 345 are electrically connected to the first electromagnetic portion 342 and the second electromagnetic portion 343, respectively. The third control terminal 346 is electrically connected to both the first electromagnetic portion 342 and the second electromagnetic portion 343.

Figure 3:
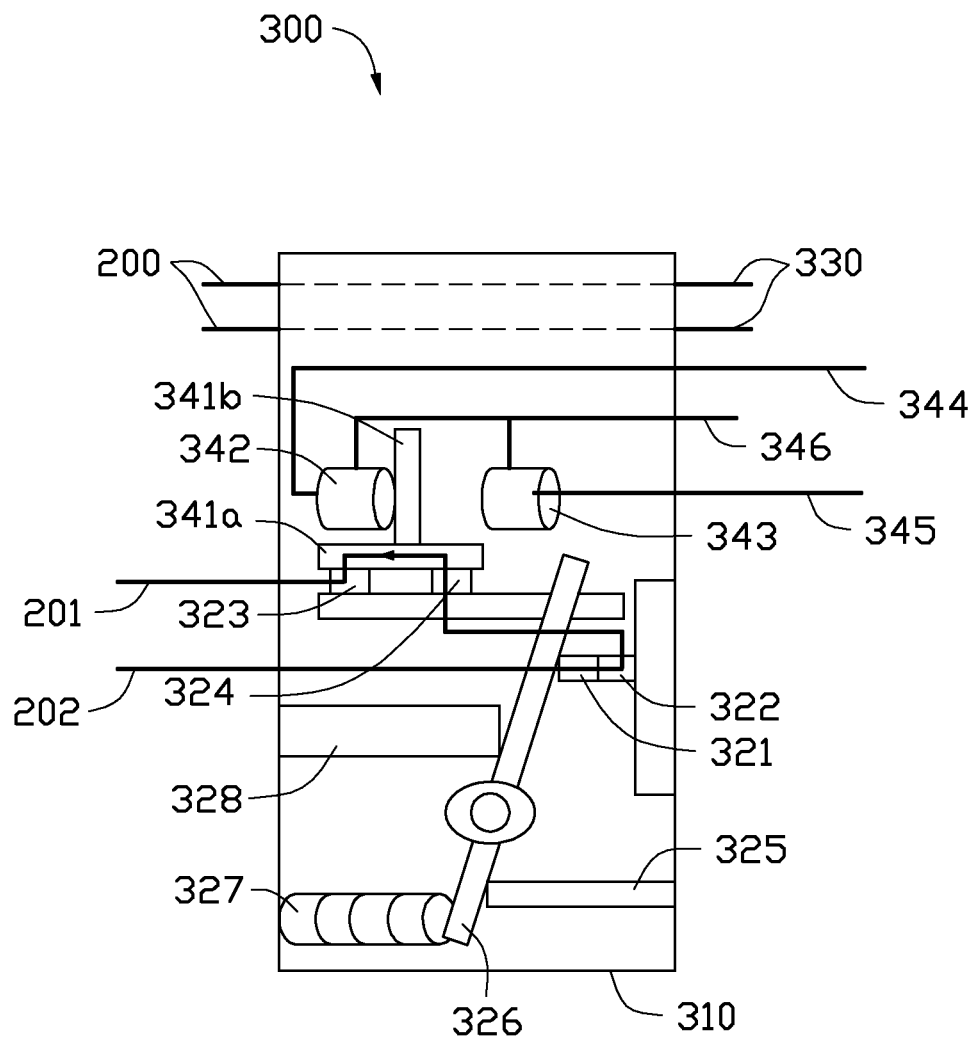
FIG. 3 is a schematic diagram of the internal structure of the power output unit of FIG. 1 electrically connecting to an electronic device.
Figure 4:
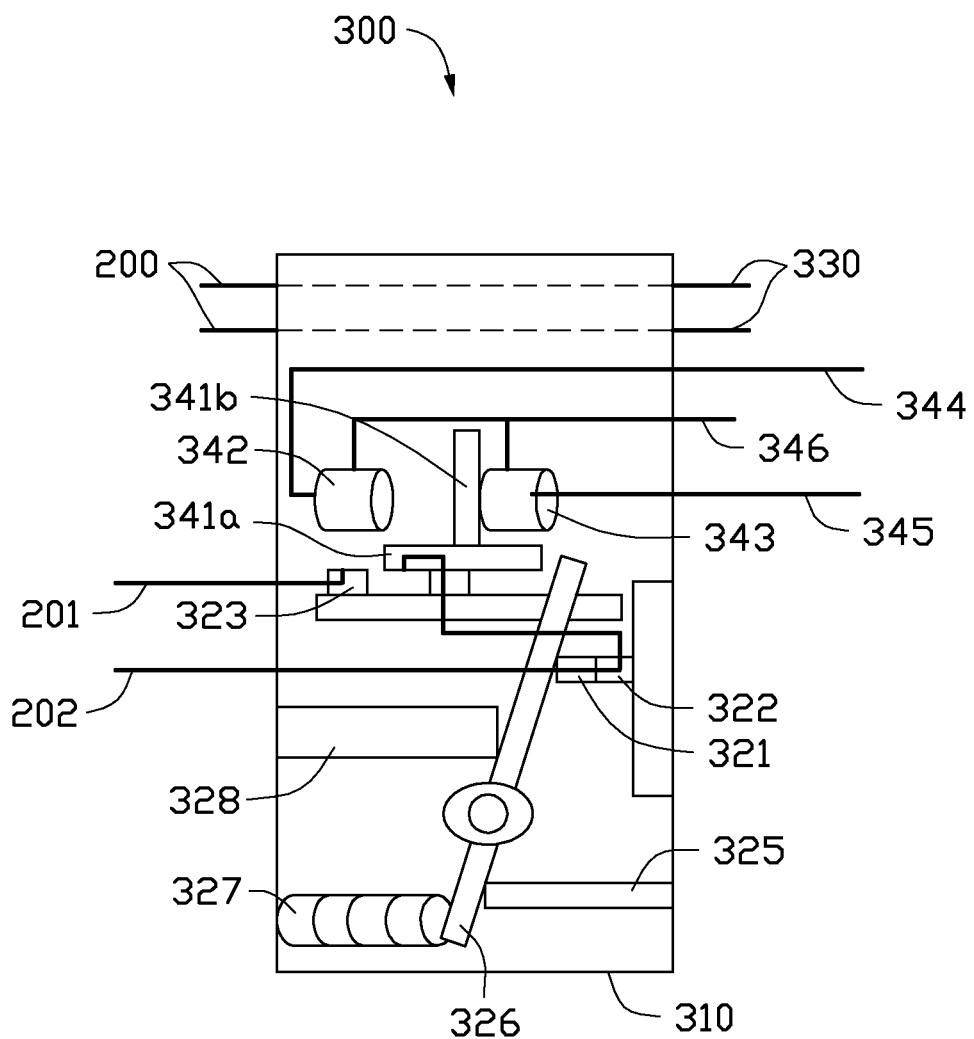
FIG. 4 is a schematic diagram of the internal structure of the power output unit of FIG. 1 after being fully charged.

FIGS. 2-4 show different states of the electronic device 20. Referring to FIG. 2, when the charging device 10 is disconnected from the electronic device 20, the rotation bar 326 is substantially perpendicular to the third side surface 313, the elastic member 327 is not compressed, the first connection terminal 321 is disconnected from the second connection terminal 322, and the sliding member 341a is electrically connected between the third connection terminal 323 and the fourth connection terminal 324.

When the first connection terminal 321 is disconnected from the second connection terminal 322, the second input terminal 112 is disconnected from the second conductive pin 102. At this time, the second connection terminal 322, the first connection terminal 321, the first cable 201, and the converter 110 stop working.

Referring to FIG. 3, when the charging device 10 charges the electronic device 20, the detection bar 325 is pushed into the shell 310 by the electronic device 20. The detection bar 325 pushes the rotation bar 326 to rotate about the pivot 329, and the elastic member 327 is compressed. The rotation bar 326 drives the first connection terminal 321 to electrically connect to the second connection terminal 322. The first control terminal 344 receives a logic high signal (e.g. logic "1"), the second control terminal 345 receives a logic low signal (e.g. logic "0"), and a current flows through the first electromagnetic portion 342. Under this condition, the first electromagnetic portion 342 attracts the T-shaped portion 341, so the sliding member 341a is electrically connected between the third connection terminal 323 and the fourth connection terminal 323a. The AC power flows from the external power source to the second input terminal 112 of the converter 110 via the third connection terminal 323. Then, the converter 110 converts the AC power to the DC power. In the embodiment, the logic high signal and the logic low signal are output by the electronic device 20.

Referring to FIG. 4, when the electronic device 20 is fully charged, the first control terminal 344 receives the logic low signal, and the second control terminal 345 receives the logic high signal, so the current flows through the second control terminal 345 and the third control terminal 346. Under this condition, the second electromagnetic portion 343 attracts the sliding member 341a, so the sliding member 341 is electrically disconnected from the third connection terminal 323. Thus, the converter 110 stops receiving the AC power.

When the electronic device 20 is disconnected from the power output unit 300, the detection bar 325 is rebounded out of the shell 310 by the elastic member 327, and the rotation bar 326 rotates about the pivot 329. Thus, the first connection terminal 321 is moved away from the second connection terminal 322, and the sliding member 341a is slid toward the third connection terminal 323. Thus, the power output unit 300 is reset to the state shown in FIG. 2.

Figure 5:
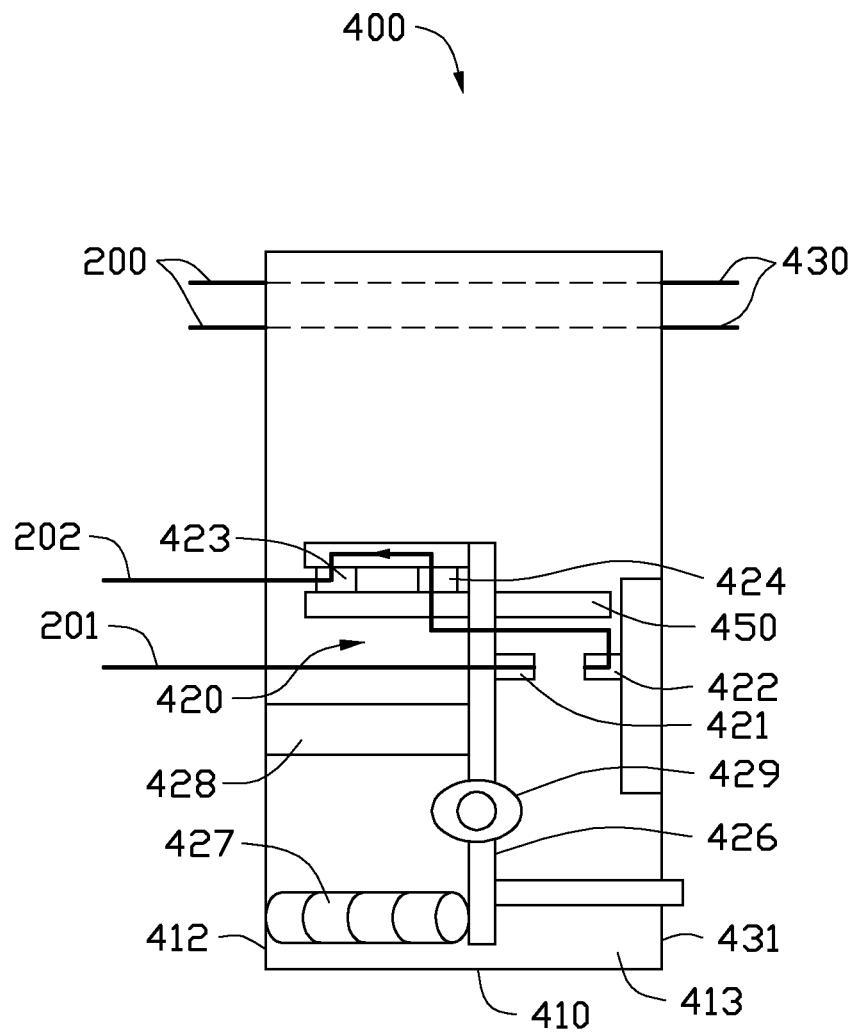
FIG. 5 is a schematic diagram of a second embodiment of an internal structure of a power output unit of a charging device disconnected from an electronic device.
Figure 6:
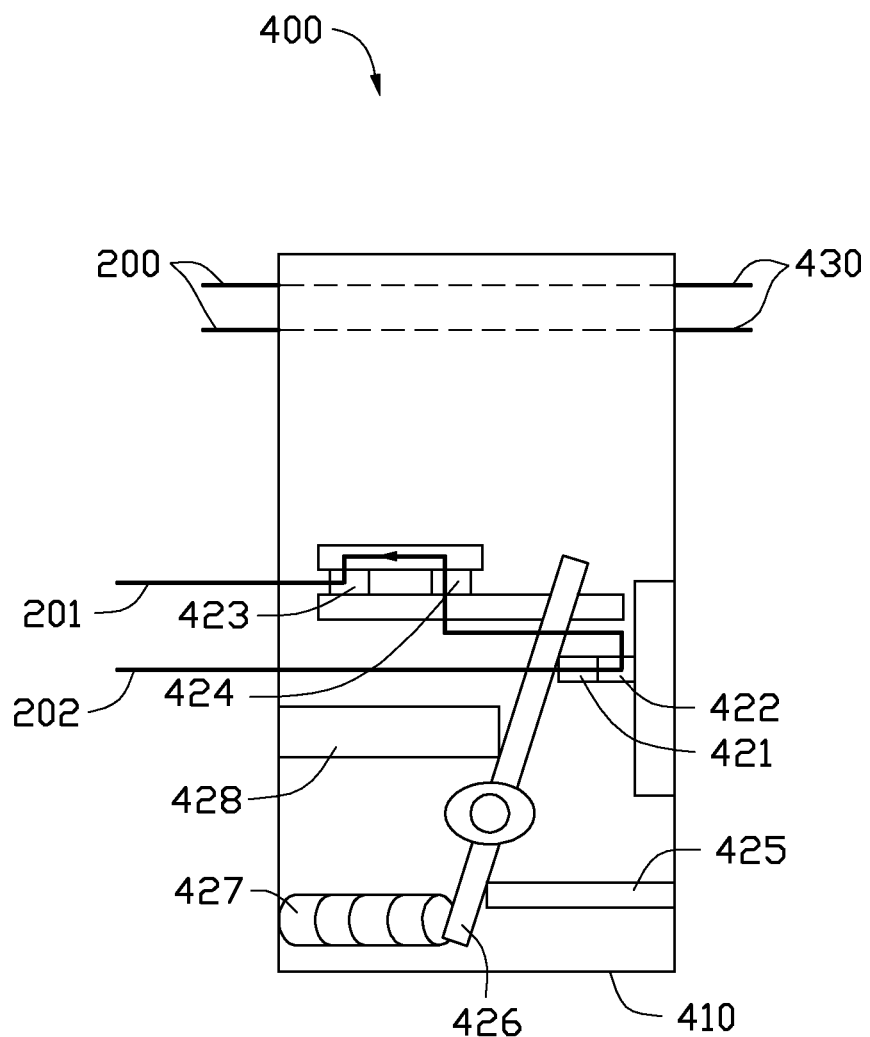
FIG. 6 is a schematic diagram of the internal structure of the power output unit of the charging device of FIG. 5 in a state of being charged.

FIGS. 5 and 6 show an internal structure of a second embodiment of a power output unit 400. The power output unit 400 is substantially similar to the power output unit 300, except that the power output unit 400 only includes a first switch 420. A third connection terminal 423 is always electrically connected to a fourth connection terminal 424.

Figure 7:
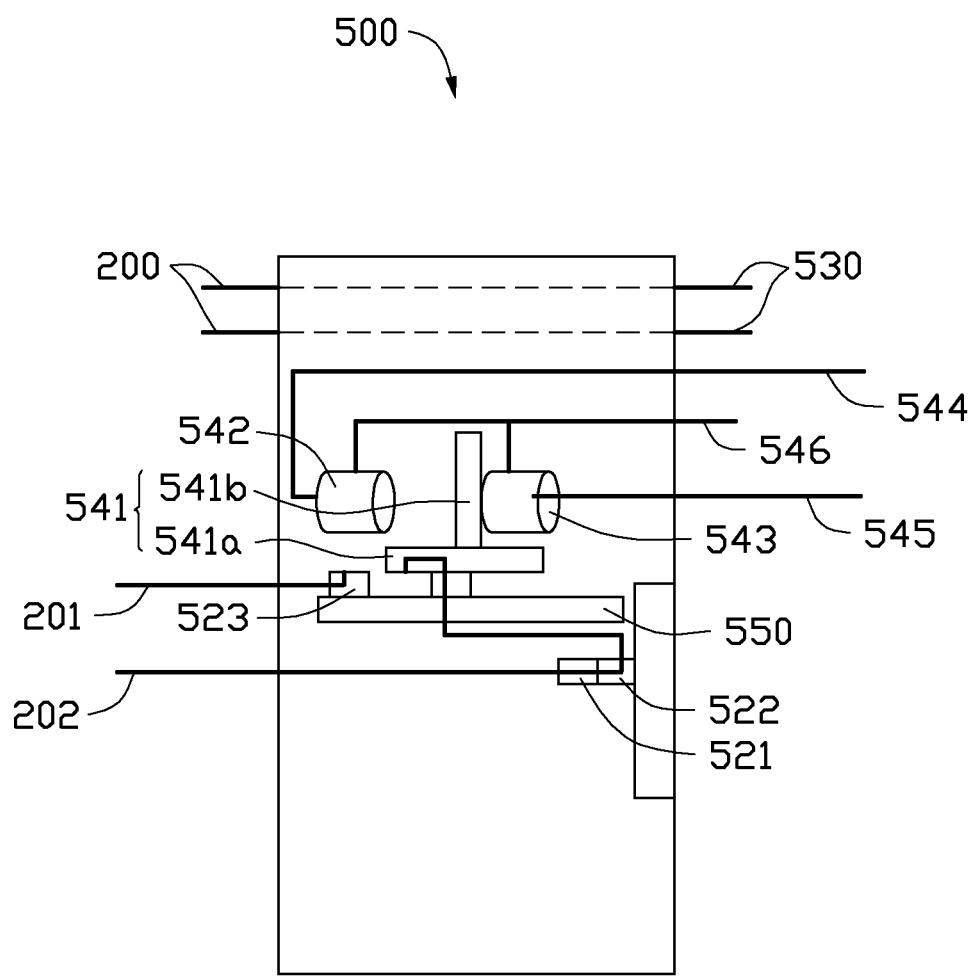
FIG. 7 is a schematic diagram of a third embodiment of an internal structure of a power output unit of a charging device disconnected from an electronic device.
Figure 8:
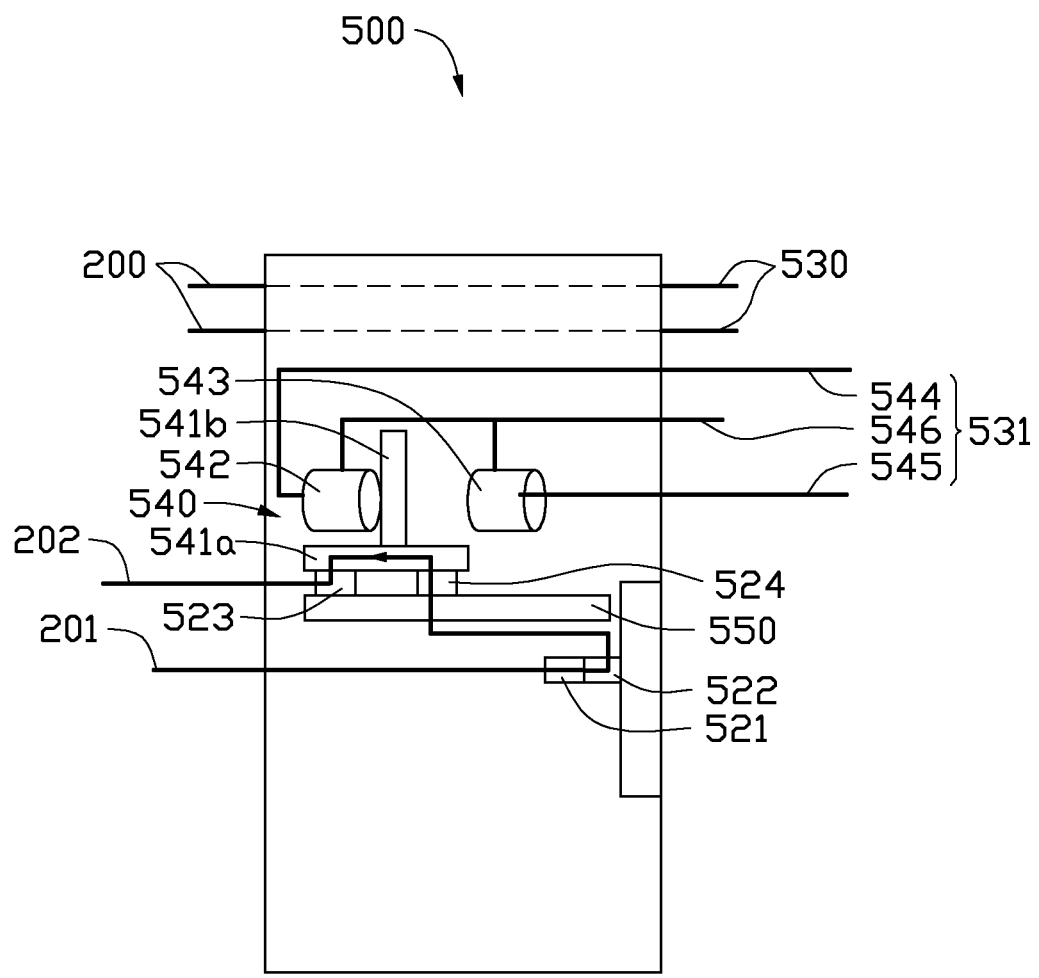
FIG. 8 is a schematic diagram of the internal structure of the power output unit of the charging device of FIG. 7 in a state of being charged.

FIGS. 7 and 8 show an internal structure of a third embodiment of a power output unit 500. The power output unit 500 is substantially similar to the power output unit 300, except that the power output unit 500 includes a second switch 540, a first connection terminal 521, a second connection terminal 522, a third connection terminal 523, and a fourth connection terminal 524. The second switch 540 is substantially the same as the second switch 340. The first connection terminal 521 is fixed on the second connection terminal 522.

When the power output unit 500 is disconnected from the electronic device 20, or the electronic device 20 is fully charged as shown in FIG. 7, a first control terminal 544 receives a logic low signal or is floated, a second control terminal 545 receives a logic high signal, and a current flows through the second control terminal 545, a second electromagnetic portion 543, and a third control terminal 546. Under this condition, the second electromagnetic portion 543 attracts an attracting member 541*b*. Thus, the third connection terminal 523 is disconnected from a sliding member 541*a*, and the converter 110 stops working.

Referring to FIG. 8, when the charging device 10 is used to charge the electronic device 20, the first control terminal 544 receives a logic high signal, and the second control terminal 545 receives a logic low signal. Under this condition, a current flows through the first electromagnetic portion 542, so the first electromagnetic portion attracts the attracting member 541*b*. Thus, the sliding member 541*a* is electrically connected between the third connection terminal 523 and the fourth connection terminal 524. The AC power flows to the second input terminal 112 of the converter 110 via the third connection terminal 523, and the AC power is converted to the DC power.

In summary, when the electronic device 20 is fully charged or the electronic device 20 is disconnected from the charging device 300, the charging device 300 stops receiving the AC power. Therefore, energy is prevented from being wasted.

It is to be understood that even though numerous characteristics and advantages of the present embodiments have been set forth in the foregoing description, with details of the structures and functions of the embodiments, the disclosure is illustrative only; and changes may be in detail, especially in the matters of arrangement of parts within the principles of the embodiments to the full extent indicated by the broad general meaning of the terms in which the appended claims are expressed.

What is claimed is:

1. A charging device, comprising:
a power converting unit comprising a first conductive pin, a second conductive pin, and a converter, wherein when the first conductive pin and the second conductive pin are electrically connected to an alternating current (AC) power, the converter converts the AC power to a direct current (DC) power and outputs the DC power; and
a power output unit electrically connected to the converter and outputting the DC power to an electronic device, the power output unit comprising a first switch and a shell, the first switch comprising a detection bar, a rotation bar, and a elastic member;
wherein the rotation bar rotatably fixed on the shell via a pivot, a first end of the rotation bar is connected to the shell via an elastic member, a first end of the detection bar protrudes out the shell, and a second end of the detection bar resists a second end of the rotation bar;
wherein the converter comprises a first input terminal and a second input terminal, the first input terminal is electrically connected to the first conductive pin, the second input terminal is selectively and electrically connected to or disconnected from the second conductive pin under control of the power output unit.

2. The charging device of claim 1, wherein the first switch comprises a first connection terminal and a second connection terminal, the first connection terminal is electrically connected to the second conductive pin, the second connection terminal is electrically connected to the second input terminal.

3. The charging device of claim 2, wherein a plurality of electrical pins are electrically connected to the converter via the plurality of cables, and the shell forms a receiving space to receive the plurality of electrical pins.

4. The charging device of claim 1, wherein the detection bar detects whether the electronic device is electrically connected to the power output unit, and when the electronic device is electrically connected to the power output unit, the detection bar is pushed into the shell by the electronic device, when the electronic device is disconnected from the power output unit, the detection bar is rebound out of the shell by the elastic member.

5. The charging device of claim 1, wherein the first switch further comprises a supporting portion located on the shell to limit a rotation angle of the rotation bar.

6. The charging device of claim 1, wherein power output unit further comprises a third connection terminal and a fourth connection terminal, the fourth connection terminal is electrically connected to the second connection terminal and the third connection terminal.

7. The charging device of claim 6, wherein the first switch further comprises a platform, and the third connection terminal and the fourth connection terminal are located on a same surface of the platform.

8. The charging device of claim 7, wherein the power output unit further comprises a second switch, the second switch comprises a substantially T-shaped portion, a first electromagnetic portion, and a second electromagnetic portion, when a current flows through the first electromagnetic portion and the second electromagnetic portion, the first electromagnetic portion or the second electromagnetic portion is magnetized and attract the T-shaped portion.

9. The charging device of claim 8, wherein the T-shaped portion comprises a sliding member and an attracting member, the sliding member is slidably connected to the platform and capable of sliding on the platform; the attracting member is located between the first electromagnetic portion and the second electromagnetic portion and capable of sliding along with the sliding member, when the attracting member is attracted by the first electromagnetic portion, the sliding member is electrically connected to the third connection terminal and the fourth connection terminal simultaneously, thus an electrical connection is built between the third connection terminal and the fourth connection terminal; when the attracting member is attracted by the second electromagnetic portion, the attracting member is electrically connected with the fourth connection terminal, the sliding member cut off the electrical connection between the third connection terminal and the fourth connection terminal.

10. The charging device of claim 9, wherein the power output unit further comprises a detection control portion, which comprises a first control terminal, a second control terminal, and a third control terminal; the first control terminal and the third control terminal are electrically connected to the first electromagnetic portion, the second control terminal and the third control terminal are electrically connected to the second electromagnetic portion.

11. A charging device, comprising:
a power converting unit comprising a first conductive pin, a second conductive pin, and a converter, wherein the first conductive pin and the second conductive pin are electrically connected to an alternating current (AC) power, the converter converts the AC power to a direct current (DC) power and outputs the DC power; and a power output unit electrically connected to the converter via a plurality of cables and outputting the DC power to an electronic device, the power output unit comprising a first switch and a shell, the first switch comprising a detection bar, a rotation bar, and a elastic member;

wherein the rotation bar rotatably fixed on the shell via a pivot, a first end of the rotation bar is connected to the shell via an elastic member, a first end of the detection bar protrudes out the shell, and a second end of the detection bar resists a second end of the rotation bar;

wherein when the electronic device is fully charged or the electronic device disconnected from the power output unit, the converter stops receiving the AC power.

12. The charging device of claim 11, wherein the converter comprises a first input terminal and a second input terminal, the first input terminal is electrically connected to the first conductive pin, the second input terminal is electrically connected to the second conductive pin under control of the power output unit.

13. The charging device of claim 12, wherein the first switch comprises a first connection terminal and a second connection terminal, the first connection terminal is electrically connected to the second conductive pin, the second connection terminal is electrically connected to the second input terminal.

14. The charging device of claim 13, wherein a plurality of electrical pins are electrically connected to the converter via the plurality of cables, and the shell forms a receiving space to receive the plurality of electrical pins.

15. The charging device of claim 11, wherein the detection bar detects whether the electronic device is electrically connected to the power output unit, and when the electronic device is electrically connected to the power output unit, the detection bar is pressed into the shell by the electronic device, when the electronic device is disconnected from the power output unit, the detection bar is rebound out the shell by the elastic member.

16. The charging device of claim 11, wherein power output unit further comprises a third connection terminal and a fourth connection terminal, the fourth connection terminal is electrically connected to the second connection terminal and the third connection terminal.

17. The charging device of claim 11, wherein the first switch further comprises a platform, and the third connection terminal and the fourth connection terminal are located on a same surface of the platform.

18. The charging device of claim 11, wherein the power output unit further comprises a second switch, the second switch comprises a T-shaped portion, a first electromagnetic portion, and a second electromagnetic portion, when a current flows through the first electromagnetic portion and the second electromagnetic portion, the first electromagnetic portion or the second electromagnetic portion is magnetized and attract the T-shaped portion.

* * * * *